United States Patent
Banerjee

(10) Patent No.: US 8,473,462 B1
(45) Date of Patent: Jun. 25, 2013

(54) CHANGE TRACKING FOR SHARED DISKS

(75) Inventor: Amitrajit Banerjee, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/091,239

(22) Filed: Apr. 21, 2011

(51) Int. Cl.
*G06F 17/30* (2006.01)

(52) U.S. Cl.
USPC .......................................... 707/640; 707/661

(58) Field of Classification Search
USPC .................................. 707/640, 661
See application file for complete search history.

(56) References Cited

U.S. PATENT DOCUMENTS

| | | | |
|---|---|---|---|
| 7,188,128 B1 * | 3/2007 | Nagaraj et al. ......................... 1/1 |
| 7,653,699 B1 * | 1/2010 | Colgrove et al. ............. 709/213 |
| 2008/0127228 A1 * | 5/2008 | Durojaiye et al. ............ 719/324 |
| 2009/0235024 A1 * | 9/2009 | Miki .............................. 711/114 |
| 2009/0307290 A1 * | 12/2009 | Barsness et al. .............. 707/205 |
| 2010/0179941 A1 * | 7/2010 | Agrawal et al. ............... 707/624 |
| 2010/0250834 A1 * | 9/2010 | Trika et al. ..................... 711/103 |
| 2010/0269109 A1 * | 10/2010 | Cartales ............................ 718/1 |
| 2011/0010515 A1 * | 1/2011 | Ranade ......................... 711/162 |
| 2011/0093436 A1 * | 4/2011 | Zha et al. ...................... 707/639 |

\* cited by examiner

*Primary Examiner* — Son T Hoang
(74) *Attorney, Agent, or Firm* — Campbell Stephenson LLP

(57) ABSTRACT

Various systems and methods for tracking changes in a storage device. For example, one method can involve receiving a request to perform an incremental backup of a storage device and backing up locations in the storage device that are identified as having been changed. The method also involves receiving information from each of the nodes, where the information identifies locations that have been changed by the nodes. The locations that have been changed include both data and metadata.

20 Claims, 7 Drawing Sheets

CHANGE TRACKING FOR SHARED DISKS

FIELD OF THE INVENTION

This invention relates to data storage, more particularly, to backing up data from a shared disk, such as a cluster shared volume (CSV).

DESCRIPTION OF THE RELATED ART

A storage device can be shared by multiple entities. In order to backup such a shared storage device, backup software can capture changes to the storage device made by each of the entities that accesses the storage device. This involves installing backup software on each of the entities. Each time an entity specifies a change to data in the storage device, the backup software can store information identifying the location that is changed. Changes can include writes to storage locations in the storage device as well as changes to metadata associated with the storage device.

When a storage device is shared by multiple entities, various policies can be implemented to control the access that each entity has to the shared storage device. For example, a first entity may be granted access to a specific portion of the storage device and a second entity may be granted access to a different portion. Establishing and enforcing such policies requires coordination between the entities. Implementation of policies to control access to a shared storage device can create difficulties in tracking changes to the storage device. For example, multiple ways to access the storage device may exist. Methods to track changes to the storage device where the changes are made in a first manner may be unable to detect changes made in a second manner. Detecting which manner of access to the storage device is being utilized at any given time in order to configure which change tracking method should be used may be difficult. Also, writes to a first type of data may be handled differently than writes to a second type of data, meaning that different change tracking methods are used, depending on the type of data being accessed. Thus, the policies regarding how data in a storage device is accessed can present challenges to tracking changes to the data.

SUMMARY OF THE INVENTION

Various systems and methods for tracking changes in a storage device are disclosed. For example, one method can involve receiving a request to perform an incremental backup of a storage device and backing up locations in the storage device that are identified as having been changed.

The storage device includes virtual hard disks that are configured to be accessed by virtual machines executing on a nodes that are configured to access the storage device. The nodes include a coordinator node and several non-coordinator nodes. The method also involves receiving information from each of the nodes, where the information identifies locations that have been changed by the nodes. The locations that have been changed include both data and metadata. Only the coordinator node has permission to modify the metadata. The coordinator node also collates the information received from the various nodes.

Generating the information received from the nodes involves detecting I/O operations directed to the storage device. Some of the I/O operations bypass a file system driver stack. A disk upper filter driver can detect I/O accesses to the storage device.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
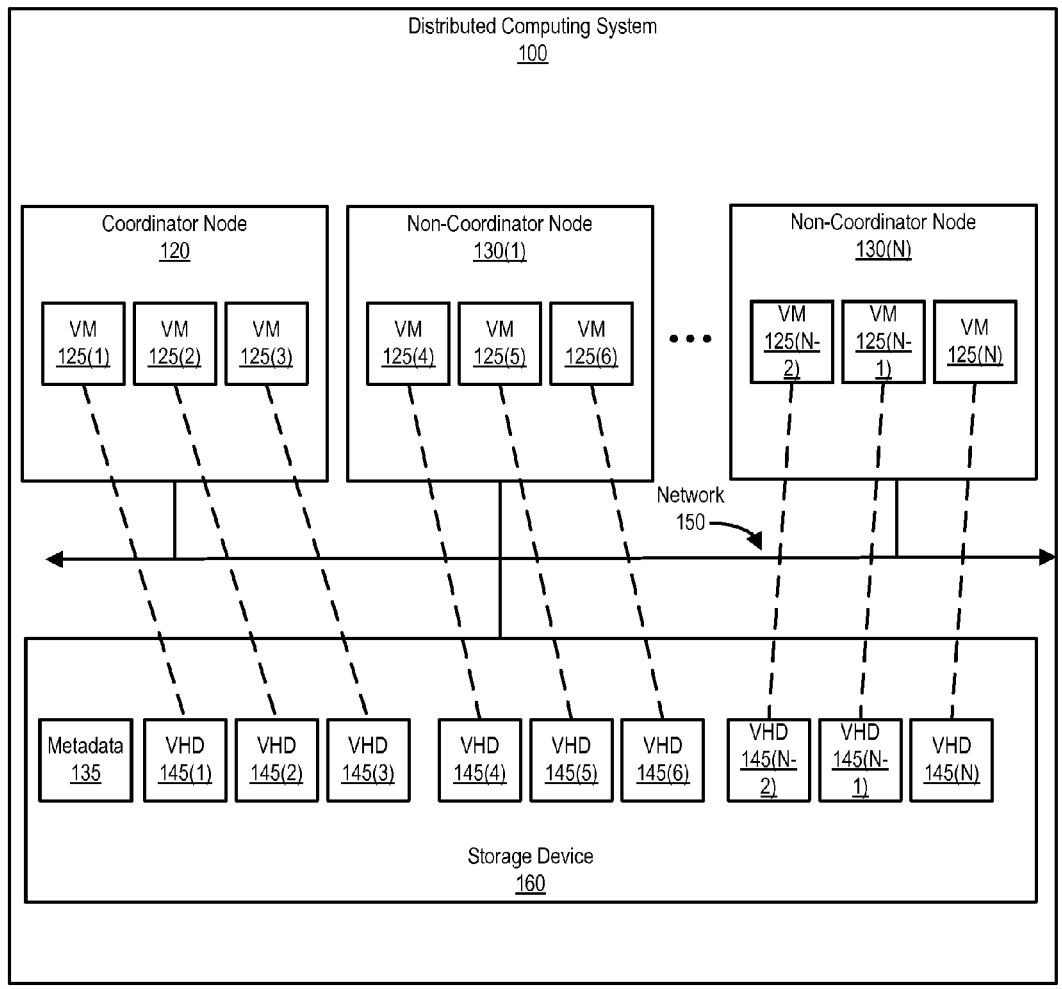
FIG. 1 is a block diagram of a system that performs backups of a shared storage device, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Each node in a distributed computing system includes at least one backup module. During normal operation of the distributed computing system, each backup module records changes made to data in a shared storage device (e.g., a CSV) by the node. For example, the backup module can detect and record changes made to data on the shared storage device by one or more virtual machines on the node. After a virtual machine makes changes to data, the backup module on the node that hosts the virtual machine records the changes, e.g., to local change list. Each node in the distributed computing system includes a backup module that can create a local change list that includes information that identifies the changes made to the node's assigned portion of the shared storage device, e.g., by the one or more virtual machines supported on that node. The local change lists can be aggregated into a composite change list that records all the changes made by all of the virtual machines executing on all of the nodes in the distributed computing system. Embodiments of the invention can store the composite change list on the shared storage device. To ensure that all changes to data in the shared storage device are detected, the backup module can include a disk upper filter driver for the shared storage device that detects such changes.

One of the nodes, e.g., a coordinator node, implements a backup application. In response to a request to create a backup of the storage device, the backup application collects information, e.g., the local change lists, from the backup modules on the nodes such that the backup application can identify all changes made to the storage device and capture all such changes in the backup operation. For example, the local change lists can identify changes made to the storage device since a previous backup operation. The backup application can perform a variety of functions including snapshot and backup generation. Periodically, the backup application can take snapshots of the shared storage device. A snapshot includes a view, or map, of a storage device at a particular point in time. Snapshots provide a map of the utilization of the physical storage objects (e.g., sectors, blocks, clusters) of the storage device.

After a snapshot is taken, the backup application can generate a backup from the snapshot. A backup is an additional copy of data that can be used to restore an original copy of data after a data loss event. Examples of data loss events include a disaster such as natural disasters (e.g., flood, fire, earthquake, etc.), man-made disasters (e.g., hardware failure, power failure, programming errors, malicious software attacks, etc.), or data that has been accidentally deleted or corrupted due to program or human error.

Backup applications can perform two major types of backups: full backups and incremental backups. A full backup includes a complete copy of all the data stored on the shared storage device. An incremental backup attempts to backup only part of the data stored on the shared storage device. An incremental backup only includes data that has been changed since a prior backup (e.g., the most recent backup). The prior backup can be a full backup or an incremental backup.

Once the backup application generates a snapshot, all backup modules update their change lists to include all changes detected as occurring before the snapshot was taken. At this point, the backup modules can each start a new local change list to record changes occurring after the snapshot. In an embodiment, the backup modules can continue modifying their respective existing local change lists, but each backup module provides a marker, e.g., a pointer, in its respective local change list that separates the changes that occurred before the snapshot from the changes that occurred after the snapshot.

In response to a snapshot being taken, the backup module or backup application also copies the changes recorded in the local change lists (if implemented) to a composite change list. The composite change list includes all the changes made by the nodes in the distributed computing system since the last backup.

Once the backup application takes the snapshot, the backup application can generate a backup from the snapshot. As previously discussed, the backup can be a full backup, which is a complete backup of all the data on the shared storage device at the particular point-of-time the snapshot was taken. The backup can also be an incremental backup, which is a backup of all changes made to the data on the shared storage device since the previous backup. The backup can also selectively include only data from particular regions of the shared storage device (e.g., the backup can be performed on a per-node or per-virtual machine basis).

FIG. 1 is a block diagram of a distributed computing system 100. As shown, distributed computing system 100 includes a coordinator node 120 and several non-coordinator nodes 130(1)-130(N) coupled to a storage device 160 by a network 150. Network 150 can include a WAN (Wide Area Network), such as the Internet, one or more LANs (Local Area Networks), and/or one or more SANs (Storage Area Networks). The nodes are not limited to communicating over network 150 but can also communicate with each other via a direct connection, a wireless connection, or any other network connection. While FIG. 1 depicts a coordinator node and non-coordinator nodes, other embodiments of the invention do not require such an implementation. For example, the distributed computing system can include multiple coordinator nodes.

Storage device 160 provides persistent data storage, such that data stored in storage device 160 will remain stored even after storage device 160 is powered off. Storage device 160 can include one or more storage devices or storage appliances such as, for example, a solid state drive, a hard disk, a compact disc (CD), a digital versatile disc (DVD), sequential access media (e.g., tape storage), or other mass storage device, file serving appliance, or storage system (e.g., a redundant array of independent disks (RAID) system or an optical storage jukebox). Storage device 160 can also include one or more types of storage media, including solid state media (e.g., flash drives), optical media (e.g., CDs and DVDs), and magnetic media (e.g., hard disks or magnetic tape). In an embodiment, storage device 160 can be implemented using cloud storage, in which storage device 160 is a logical storage device to which physical storage device(s) are allocated on an as-needed and/or as-contracted basis. Storage device 160 can be formatted with the New Technology File System (NTFS), or any other available file system, such as file allocation table (FAT) or Veritas® File System (VxFS). In an embodiment, storage device 160 is implemented as a cluster shared volume that supports concurrent access to a single volume by multiple nodes.

FIG. 1 further illustrates virtual machines (VMs) 125(1)-(N) supported by nodes 120 and 130(1)-(N). These virtual machines are software implementations of a physical computer that execute computer instructions in the manner of physical computer hardware. Virtual machines 125(1)-(N) read and write data to virtual hard drives (VHDs) 145(1)-(N) allocated on storage device 160. For example, virtual machine 125(1) reads and writes data to virtual hard drive 145(1). While FIG. 1 illustrates nine virtual machines and nine virtual hard drives, embodiments of the invention can support any number of virtual machines and virtual hard drives. During operation of distributed computing system 100, some virtual machines can utilize more than one virtual hard drive, and thus some embodiments may implement differing numbers of virtual machines and virtual hard drives.

The virtual hard drives can be implemented as virtual hard drive files. A virtual hard drive file is similar to a normal file on storage device 160. However, one difference is that the virtual hard drive file is assigned to a virtual machine hosted on either the coordinator node or on a non-coordinator node. The virtual machine accesses the VHD file via direct I/O, which is discussed herein in more detail below. A normal file (e.g., a file other than a VHD file) on storage device 160 is accessed (e.g., by an application other than a virtual machine) via redirected I/O (discussed herein in more detail below) by a non-coordinator node. The coordinator node (e.g., coordinator node 120) accesses both normal files and virtual hard drive files in a similar fashion to each other. While non-coordinator nodes support two access modes (direct I/O and redirected I/O), a coordinator node uses a single mode to access any file on storage device 160, whether a file is a VHD file or normal file.

Coordinator node 120, more particularly, for example, file system 210, can assign certain disk blocks of storage device 160 for both normal files and virtual hard drive files. In the above example, virtual machine 125(1) reads and writes data to hard disk drive blocks allocated to form a virtual hard drive file. The virtual hard drive file represents virtual hard drive 145(1) on storage device 160.

In an embodiment, storage device 160 is implemented such that a single host, designated as the coordinator node (e.g., coordinator node 120) is enabled to modify metadata 135. Metadata 135 can include information such as file names, sizes, creation dates, locations, access permissions, and the like. The other nodes (e.g., non-coordinator nodes 130(1)-(N)) are not permitted to modify metadata 135 and request modification of metadata 135 by transmitting such a request to coordinator node 120, e.g., via network 150. In response to the request, coordinator node 120 can modify metadata 135 as requested by the non-coordinator node 130. After modifying metadata 135 according to the request, coordinator node 120 sends a confirmation message to the non-coordinator node 130 that requested the metadata modification.

An example of a metadata modification request is a request from a non-coordinator node to change the allocation of hard disk drive blocks that form a VHD 145. The number of hard disk drive blocks allocated to a particular VHD 145 can be increased (to increase the storage capacity of the virtual hard drive file) or decreased (to decrease the storage capacity of the virtual hard drive file).

To improve distributed computing system performance, each non-coordinator node 130 requests exclusive access to certain regions of storage device 160. The non-coordinator nodes 130 send the requests for exclusive access to coordinator node 120, which grants the requests. The regions of storage device 160 requested by the non-coordinator nodes correspond to the VHDs 145 accessed by the virtual machines 125 implemented by the non-coordinator nodes 130. Once coordinator node 120 grants the request, the non-coordinator nodes 130 can access their requested regions of storage device 160 directly (referred to as "direct I/O") without first sending access requests to the coordinator node.

For example, non-coordinator node 130(1) supports three virtual machines: virtual machines 125(4)-(6). Virtual machines 125(4)-(6) read and write data to virtual hard drives 145(4)-(6), respectively. Once coordinator node 120 grants non-coordinator node 130(1) exclusive access to the regions on storage device 160 corresponding to virtual hard drives 145(4)-(6), virtual machines 125(4)-(6) can access those regions using direct I/O (through non-coordinator node 130(1)).

On the other hand, all requests to modify metadata 135 by a non-coordinator node 130 (e.g., a virtual machine 125 executing on the non-coordinator node 130) are processed using redirected I/O. Redirected I/O involves the non-coordinator node 130 first sending a request to coordinator node 120. If the request is a read request, the coordinator node 120 reads the requested data from storage device 160 and returns the requested data, e.g., via network 150, to the non-coordinator node 130. If the request is a write request, the non-coordinator node 130 sends the data to be written with the write request, e.g., via network 150, to the coordinator node 120. In response to receiving the write request and the data to be written, the coordinator node 120 writes the data to the appropriate data locations in storage device 160 and sends back a completion status to the non-coordinator 130 node via network 150. At times, such as when a snapshot is being created or maintained, the coordinator node 120 can restrict direct I/O by the non-coordinator nodes 130, which forces the non-coordinator nodes 130 to use redirected I/O for all I/O to the shared storage device, even for access to VHDs 145 allocated to virtual machines 125 on those nodes.

One example of redirected I/O involves a virtual machine 125's I/O request to write to a virtual block that has not been previously accessed by the virtual machine 125. This type of request first goes to the coordinator node 120. Space for this new virtual block can be allocated by increasing the size of the virtual hard drive 145 associated with the virtual machine 125. The non-coordinator node 130 first sends the allocation request to the coordinator node 120. Then, the coordinator node 120 allocates the requested virtual block to the virtual hard drive 145 and updates metadata 135. The coordinator node 120 then notifies the non-coordination node 130 executing the virtual machine 145 that the storage capacity of the virtual hard drive 145 has been increased. The virtual machine 125 then completes the write request, using direct I/O.

According to one embodiment, a block used for I/O purposes can be of various sizes. For instance, many file system I/O reads and writes blocks that are a multiple of a cluster size. In the case of NTFS, the cluster size is 4 K.

Figure 2A:
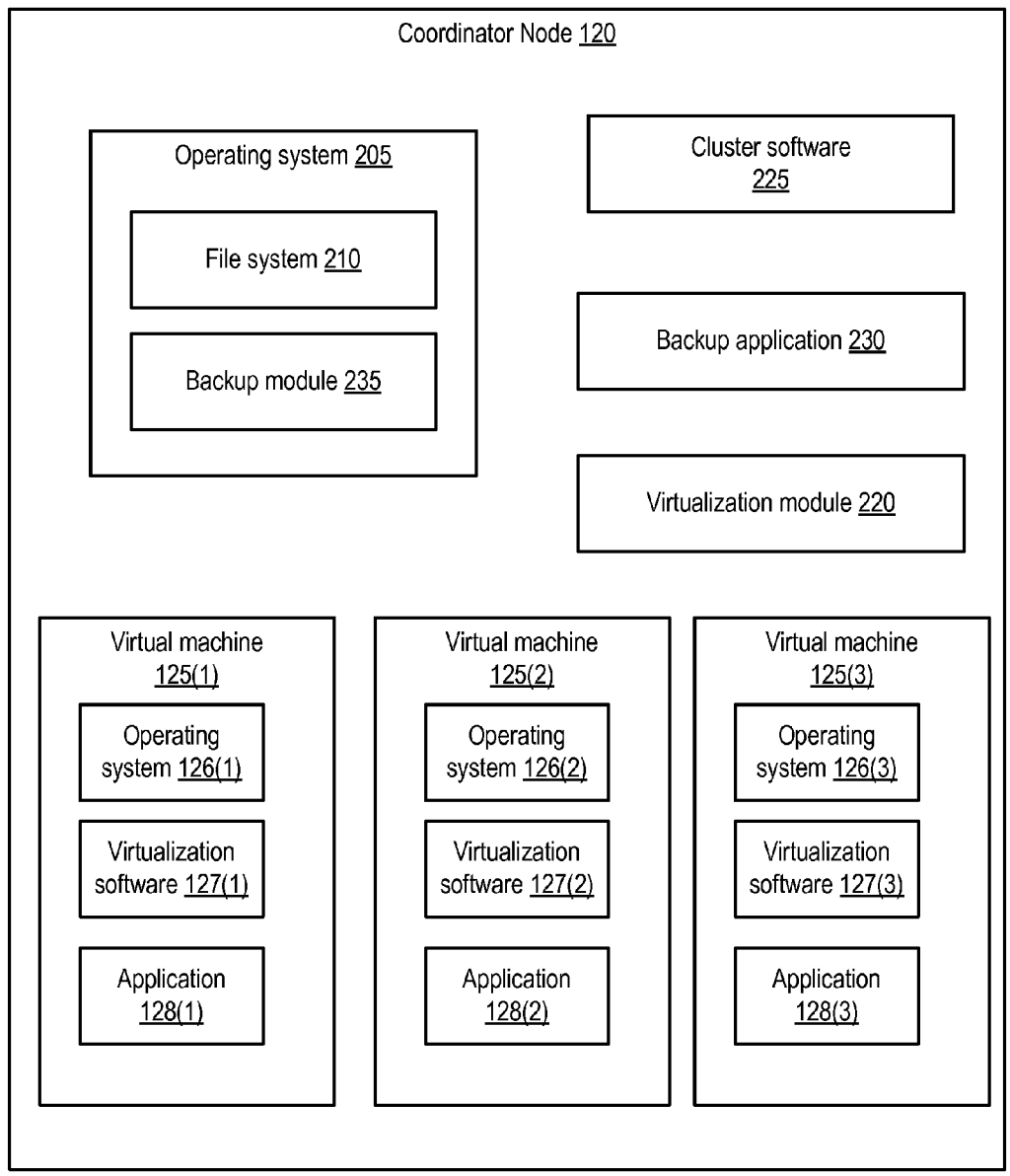
FIG. 2A is a block diagram of a coordinator node that accesses a shared storage device, according to one embodiment of the present invention.

FIG. 2A shows additional features of coordinator node 120. As illustrated, coordinator node includes an operating system 205, a file system 210, virtualization module 220, cluster software 225, a backup application 230, backup module 235, and virtual machines 125(1)-125(3), which each include an operating system 126(1)-126(3), virtualization software 127(1)-127(3), and an application 128(1)-128(3), respectively. Coordinator node 120 can be implemented as a computing device such as a personal computer, laptop computer, server, personal digital assistant, cell phone, or the like.

In an embodiment, one or more nodes of distributed computing system 100 of FIG. 1, e.g., coordinator node 120, can be included in a cluster. Cluster software 225 can provide cluster-related functionality that allows multiple nodes to work together to provide enhanced performance and availability. For example, the cluster software can monitor the health and status of nodes in the cluster through the exchange of heartbeat messages.

Operating system 205 is known as a host operating system and provides access to and manages resources of coordinator node 120, such as processor cycles, storage space, and network bandwidth. One example of such an operating system is Microsoft Windows Server 2008 R2®.

File system 210 can organize data, such as data in storage device 160, into files and directories. File system 210 can maintain a listing of the physical locations of files and data in storage device 160. For example, when an application requests that a new file be created, operating system 205 can inform file system 210 of parameters of the file, such as size and type, associations, and various other metadata. With this information, file system 210 can determine which physical sectors, e.g., in storage device 160, will store data for the file. Similarly, when an application, e.g., application 128, directs a write to storage device 160, file system 210 assigns specific physical sectors to store the data that is written. File system 210 keeps track of which physical clusters are used, which files store data in the used physical clusters, and which physical clusters are unused. Such information can be stored, for example, in metadata 135 of FIG. 1.

Virtualization module 220 performs operations related to creation and management of virtual machines and resources for virtual machines. Virtualization module 220 is illustrated as a stand-alone module but can also be included in operating system 205. Virtualization module 220 includes software and/or hardware that provides coordinator node 120 the ability to concurrently support one or more virtual machines, such as virtual machines 125(1)-(3). Virtualization module 220 provides such ability by coordinating the distribution of computer resources (e.g., processing power, memory, etc.) among virtual machines 125(1)-(3) so that virtual machines 125(1)-(3) operate similarly to physical computers.

Virtualization module 220 coordinates and manages demands by the virtual machines for host computer system resources. Virtualization module 220 can be executed on "bare hardware" (e.g., execute on physical hardware, without need for intervening software). This is referred to as a native virtual machine. Alternatively, virtualization module 220 can interface with a coordinator node 120's physical hardware via operating system 205 (also referred to as a hosted virtual machine). One or more of virtualization module 220's functions can be implemented directly in hardware, rather than being implemented in software. Using the foregoing example, virtualization module 220 supports multiple virtual machines by coordinating processor resources to support the execution of instructions on behalf of the various virtual machines and performing memory management to help ensure that the virtual machines effectively share the host computer's system memory.

Virtual machines 125(1)-(3) are implemented on coordinator node 120. In general terms, virtual machine 125 is a software construct that acts as a physical computer system. For instance, virtual machine 125 can execute applications, e.g., application 128, provide services, and process commands. A virtual machine can execute its own operating system, known as a guest operating system, e.g., operating system 126. Example operating systems that can be implemented by the virtual machines include, but are not limited to, Windows XP®, Windows Vista®, Linux, Mac OS X®, and the like. Guest operating system 126 operates like an operating system on the host node in that applications executing on the virtual machine are presented with available resources. However, virtualization software 127 relays requests for data and/or access to computing resources, e.g., processor cycles, made by applications on the virtual machine to the host operating node, e.g., to virtualization software 220 or operating system 205.

An advantageous feature of a host computer system, such as coordinator node 120, that supports at least one virtual machine, such as virtual machine 125(1), is the ability to support the execution of more than one operating system (OS) at a time. For example, a host computer system can execute a host OS, e.g., Mac OS X®. A virtualization module, such as Parallels Desktop® 4.0, can be used to provide the ability for the host computer to implement multiple virtual machines. In such an architecture, each of the virtual machines (also referred to herein as a "guest virtual machine") executes a corresponding guest OS.

Virtual machine 125 can execute one or more applications 128. Application 128 can include software directed to accounting, word processing, media consumption, procurement and development, product development, and the like. Application 128 accesses (e.g., by generating and/or consuming) data on storage device 160.

Coordinator node 120 also includes a backup application 230 and a backup module 235. Backup application 230 can create full or incremental backups of a storage device, such as storage device 160 of FIG. 1. In an embodiment, backup application 230 receives a local change list from backup modules on one or more nodes in the distributed computing system, such as backup module 235. Backup application 230 then collates the local change lists and creates a composite change list that identifies all changes made to the storage device. The composite change list identifies not only changes made to data stored in the storage device (by both the coordinator node and non-coordinator nodes), but also changes made to metadata (by the coordinator node) regarding the data stored in the storage device. Thus all changes to the storage device are captured and backed up, including changes to data, e.g., write or move operations, by an application on a virtual machine, an application on the node itself, or an application on a client machine, as well as changes to metadata, such as the resizing of a VHD in the storage device.

Backup module 235 creates a local change list and transmits the local change list to backup application 230 in response to a backup operation being initiated. The backup module captures changes made by direct I/O to a VHD associated with a virtual machine hosted by the coordinator node. The backup module on the coordinator node also captures changes made by redirected I/O. Changes made by redirected I/O include, for example, changes to metadata, changes made by applications that are not executed on virtual machines, and changes made by applications executing on virtual machines when the virtual machines do not have direct I/O access to the VHDs, such as while a backup operation is ongoing.

In an embodiment, backup module 235 can use a disk upper filter driver to detect changes to storage device 160. A driver is software that controls the interactions of a device and other software that uses the device. One example of a driver is a storage (or disk) driver, which enables data I/O commands issued by software (e.g., an application such as a word processor, etc.) to be translated into specialized commands that are compatible with a given storage device. During normal operation of an operating system, drivers are loaded to provide various programs with access to certain devices (e.g., a storage device, printer, scanner, digital camera, etc.).

The disk upper filter driver is included in a driver stack for the storage device. When an I/O request is directed to the storage device, the I/O request passes through the storage driver stack. The disk upper filter driver can detect the I/O request directed to the storage device and can store information identifying the change embodied in the I/O request in a local change list. The information stored in the local change list can identify which location(s) the change is directed to. A user can configure backup module 235 to monitor specific portions of the storage device and record change information for changes that are directed to the specific portions. For example, if a node hosts three virtual machines, backup module 235 can monitor three VHDs that correspond to the virtual machines.

In an embodiment, local change list is implemented as a bitmap. In response to detecting a change to a sector in the storage device, backup module 235 sets a bit in the bitmap corresponding to the sector. Each local change list can be stored on the storage device or locally on the node that generated that local change list.

An example change that backup module 235 can detect follows. An application executing on a virtual machine 125 specifies that a file is to be written. Virtual machine 125's guest operating system 126 passes an I/O request corresponding to the write to the host operating system 205. Ordinarily, operating system 205 would pass the I/O request to a file system driver stack and then to a storage device driver stack. The file system driver stack is maintained by the file system, e.g., file system 210. The storage device driver stack is maintained by operating system 205. However, in certain cases, a filter driver causes the I/O request to bypass the file system driver stack. For example, when the I/O request is performed using direct I/O, a filter driver captures the I/O request and transmits the I/O request directly to the storage device driver stack, causing the I/O request to bypass the file system driver stack. This filter driver can be installed as part of configuring the storage device to operate as a cluster shared volume. When the filter driver causes the I/O request to bypass the file system driver stack, and proceeds directly to the storage device driver stack, a disk upper filter driver in the storage device driver stack can detect the I/O request, and pass information identifying the change embodied therein to backup module 235. Backup module 235 can record this information in a local change list.

Figure 2B:
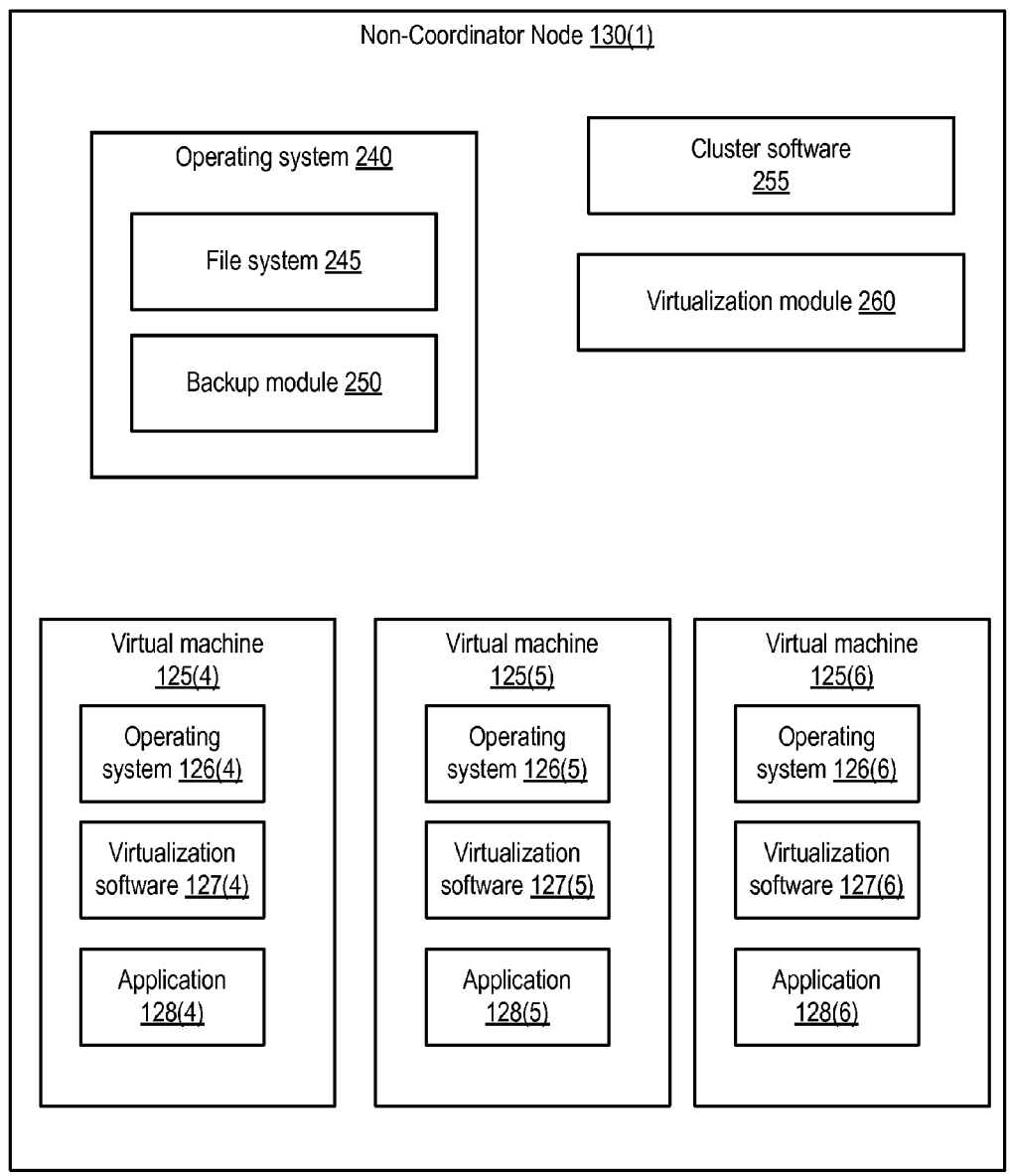
FIG. 2B is a block diagram of a non-coordinator node that accesses a shared storage device, according to one embodiment of the present invention.

FIG. 2B shows additional features of a non-coordinator node 130(1). As illustrated, coordinator node includes an operating system 240, a file system 245, virtualization module 260, cluster software 255, backup module 250, and virtual machines 125(4)-125(6), which each include an operating system 126(4)-126(6), virtualization software 127(4)-127(6), and an application 128(4)-128(6), respectively. Coordinator node 130(1) can be implemented as a computing device such as a personal computer, laptop computer, server, personal digital assistant, cell phone, or the like. Non-coordinator nodes 130(2)-(N) include similarly-configured components as coordinator node 130(1).

Cluster software 255 can provide cluster-related functionality. For example, the cluster software can monitor the health and status of nodes in the cluster through the exchange of heartbeat messages. Operating system 240 is known as a host operating system and provides access to and manages resources of non-coordinator node 130(1), such as processor cycles, storage space, and network bandwidth. One example of such an operating system is Microsoft Windows Server 2008 R2®

File system 245 can organize data, such as data in storage device 160, into files and directories. File system 245 can maintain a listing of the physical locations of files and data in storage device 160. For example, when an application requests that a new file be created, operating system 240 can inform file system 245 of parameters of the file, such as size and type, associations, and various other metadata. With this information, file system 245 can determine which physical blocks, e.g., in storage device 160, will store data for the file. Similarly, when an application, e.g., application 128, directs a write to storage device 160, file system 245 assigns specific physical blocks to store the data that is written. File system 245 keeps track of which physical blocks are used, which files store data in the used physical blocks, and which physical blocks are unused. Such information can be stored, for example, in metadata 135 of FIG. 1.

Virtualization module 260 performs operations related to creation and management of virtual machines and resources for virtual machines. Virtualization module 260 is illustrated as a stand-alone module but can also be included in operating system 240. Virtualization module 260 includes software and/or hardware that provides non-coordinator node 130(1) the ability to concurrently support one or more virtual machines, such as virtual machines 125(4)-(6). Virtualization module 260 provides such ability by coordinating the distribution of computer resources (e.g., processing power, memory, etc.) among virtual machines 125(4)-(6) so that virtual machines 125(4)-(6) operate similarly to physical computers.

Virtualization module 260 coordinates and manages demands by the virtual machines for host computer system resources. Virtualization module 260 can be executed on "bare hardware" (e.g., execute on physical hardware, without need for intervening software). This is referred to as a native virtual machine. Alternatively, virtualization module 220 can interface with non-coordinator node 130(1)'s physical hardware via operating system 240 (also referred to as a hosted virtual machine). One or more of virtualization module 260's functions can be implemented directly in hardware, rather than being implemented in software. Using the foregoing example, virtualization module 260 supports multiple virtual machines by coordinating processor resources to support the execution of instructions on behalf of the various virtual machines and performing memory management to help ensure that the virtual machines effectively share the host computer's system memory.

Virtual machines 125(4)-(6) are implemented on non-coordinator node 130(1). In general terms, virtual machine 125 is a software construct that acts as a physical computer system. For instance, virtual machine 125 can execute applications, e.g., application 128, provide services, and process commands. A virtual machine can execute its own operating system, known as a guest operating system, e.g., operating system 126. Example operating systems that can be implemented by the virtual machines include, but are not limited to, Windows XP®, Windows Vista®, Linux, Mac OS X®, and the like. Guest operating system 126 operates like an operating system on the host node in that applications executing on the virtual machine are presented with available resources. However, virtualization software 127 relays requests to the host operating node, e.g., to virtualization software 260 or operating system 240.

Virtual machine 125 can execute one or more applications 128. Application 128 can include software directed to accounting, word processing, media consumption, procurement and development, product development, and the like. Application 128 accesses (e.g., by generating and/or consuming) data on storage device 160.

Backup module 250 creates a local change list and transmits the local change list to backup application 230 of FIG. 2A in response to a backup operation being initiated. The backup module captures direct I/O accesses to a VHD associated with a virtual machine hosted by the non-coordinator node.

When a virtual machine or application on non-coordinator node 130(1) uses redirected I/O, e.g., requests a change to metadata or requests a change to data during a period when direct I/O is not permitted by the coordinator node, a filter driver in operating system 240 redirects the I/O request to coordinator node 120, where the coordinator node's host operating system passes the I/O request through the coordinator node's file system driver stack and then to the coordinator node's storage device driver stack. These I/O requests are captured by the coordinator node's backup module.

When a virtual machine on non-coordinator node 130(1) uses direct I/O, e.g., writes data to a VHD, a filter driver can transmit the I/O request directly to a driver stack for storage device 160 in operating system 240, causing the I/O request to bypass the volume driver stack for any volume implemented on storage device 160 as well as the file system driver stack for file system 245. In order to capture the change included in the I/O request, backup module 250 can use a disk upper filter driver. The disk upper filter driver is included in a driver stack for the storage device. When the I/O request is received at the storage device driver stack, the disk upper filter driver can detect the I/O request and transmits information identifying the change embodied therein to backup module 250. Backup module 250 can add the information a local change list. For example, the information can include which location(s) in storage device 160 the I/O request is directed to.

A user can configure backup module 250 to monitor specific portions of the storage device and record change information for changes that are directed to the specific portions. For example, if a node hosts three virtual machines, backup module 250 can monitor three VHDs that correspond to the virtual machines.

In an embodiment, local change list is implemented as a bitmap. In response to detecting a change to a sector in the storage device, backup module 250 sets a bit corresponding to the sector in the bitmap. Each local change list can be stored on the storage device, or locally on the node that generated that local change list.

Figure 3:
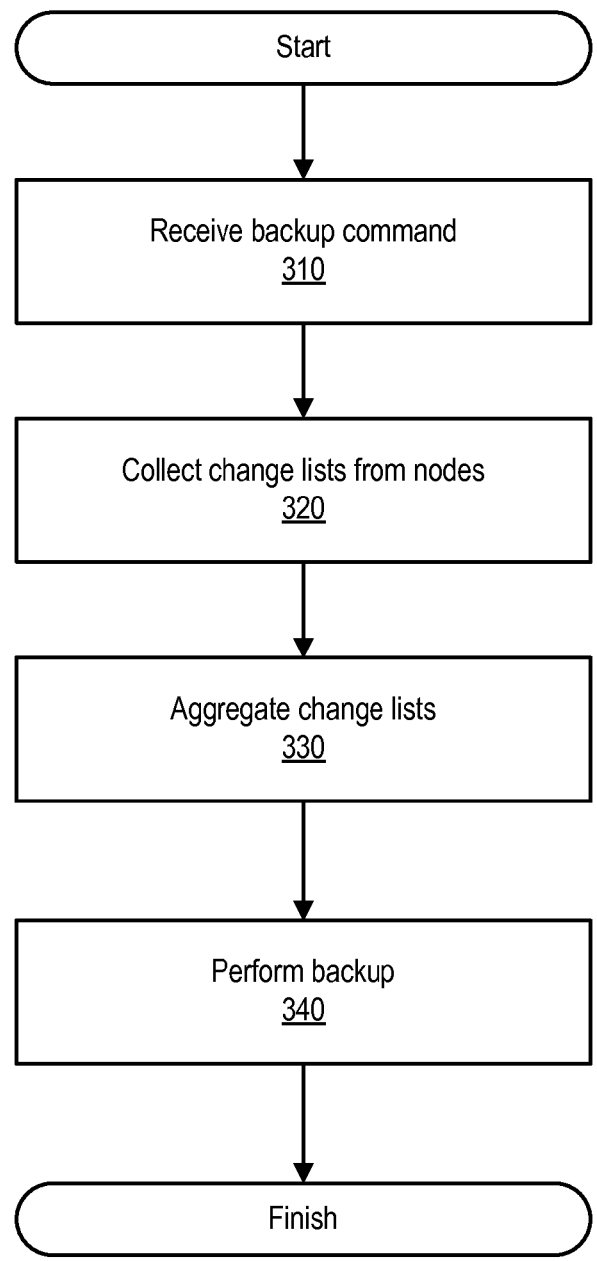
FIG. 3 is a flowchart of a method of backing up a shared storage device, according to one embodiment of the present invention.

FIG. 3 is a flowchart of a method of backing up a storage device. The method can be performed by a computing system such as distributed computing system 100 of FIG. 1. The method begins at 310, where a backup application, e.g., backup application 230 of FIG. 2A, receives a backup command. The backup command can be received as a result of a manual initiation of a backup operation, e.g., a user-initiated backup operation, or automatically, e.g., in response to the backup application detecting the occurrence of an event, such as an amount of time elapsed since a previous backup, or in response to detecting a specified time and/or date. The backup command includes information specifying a storage device, e.g., storage device 160, and specifies that all data, including metadata, in the storage device should be backed up. The backup command can specify a full or incremental backup operation is to be performed. In an embodiment, the backup command can specify that only a portion of the storage device be backed up, e.g., a specific file.

In response to the backup command, the backup application collects change lists from one or more backup modules, e.g. backup module 235 of FIG. 2A, at 320. This can involve the backup application sending a request to each node and receiving a reply from each node, where the reply includes a change list. In an embodiment, only nodes that have changed the storage device send change lists. Alternatively, all nodes can send lists, with those nodes that didn't change the storage device sending empty lists.

Each change list received from a node includes information identifying changes to made to a storage device, e.g., storage device 160 of FIG. 1. A change list identifies changes made to a portion of the storage device that the node is permitted to access. The change lists include information identifying one or more blocks of the storage device that have been modified. Blocks of the storage device can be modified using direct I/O access by one or more virtual machines that the node hosts. Blocks of the storage device can also be modified using redirected I/O by a virtual machine or other application. The change lists can include identification of the blocks as well as the data that was modified. The change lists can also identify changes to metadata, such as metadata 135 of FIG. 1. Such changes could include information indicating that a new file, e.g., a VHD file, is created and the blocks in the storage device where the new file is located.

Once the backup application has received the change lists, the backup application aggregates the changes identified in the lists at 330. Aggregating the changes involves the backup application producing a composite list that includes information identifying all changes identified in the change lists received by the backup application. For example, if the local change lists are implemented as bitmaps, the backup application can perform a bit-wise OR operation to aggregate the changes. Alternatively, if the local change lists are implemented as lists of block addresses, the backup application can concatenate addresses from the lists into a single list and/or sort the list. In an embodiment, the composite list includes all changes made by all nodes in the computing system since a previous point in time, e.g., since a previous backup operation was performed.

Using the composite list, the backup application can create a backup of the storage device at 340. Generally, the backup application generates a backup by copying all sectors identified in the composite change list as modified from the storage device to backup media. The backup media can be implemented as a secondary storage device (e.g., internal or external hard drive or network storage) or other kinds of storage media (e.g., tape, optical disks, etc.). The generated backup can take a variety of forms. For example, the backup can be a full backup of all the data stored on the storage device. The backup can be an incremental backup that backs up only data on the cluster shared volume modified since the last backup. The backup can be stored on the storage media discussed above, e.g., internal or external hard drive, network storage, or other kinds of storage media (e.g., tape, optical disks, and the like).

Figure 4:
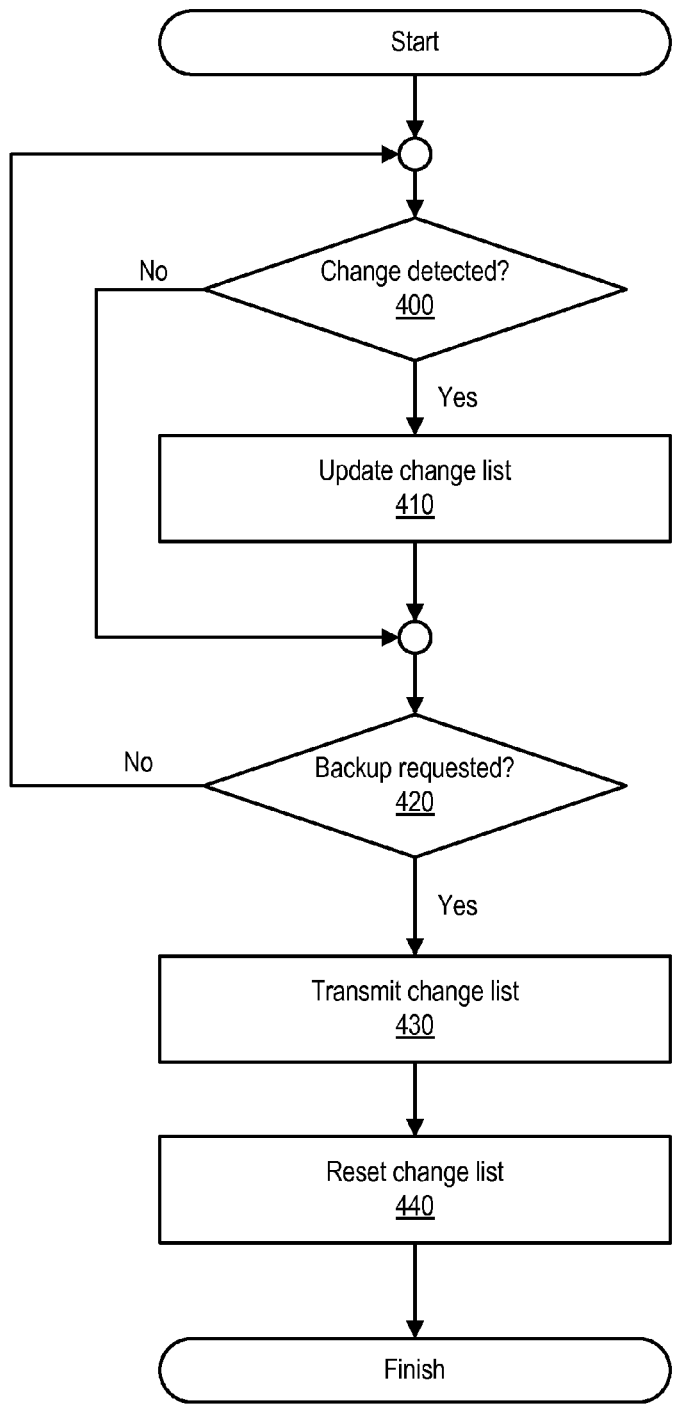
FIG. 4 is a flowchart illustrating additional elements of a method of backing up a shared storage device, according to one embodiment of the present invention

FIG. 4 is a flowchart illustrating further details of the method of backing up a storage device discussed with regard to FIG. 3. At 400, a backup module, e.g., backup module 235 of FIG. 2A detects whether any changes have been directed to a portion of a storage device, e.g., storage device 160 of FIG. 1. The backup module utilizes a disk upper filter driver that is installed on a storage device driver stack, e.g., in an operating system, such as operating system 205 of FIG. 2A.

If the backup module detects that a block of the storage device is the target of an I/O operation that changes data stored in the block, the backup module updates a change list by adding information identifying the block to the change list at 410. In an embodiment, this involves setting a bit corresponding to the location of the block in a bitmap. Alternatively, this involves adding an address of the block to the change list. Once the backup module has updated the change list, or if no change was detected by the backup module, the backup module detects whether a backup operation has been requested, at 420. In an embodiment, the backup module can detect whether a message has been received from a backup application requesting a backup operation. If the backup module detects that no backup operation is requested, the method returns to 400, and the backup module detects whether a change is detected.

If the backup module detects that a backup operation is requested, the backup module transmits the change list to a backup application, e.g., backup application 230 of FIG. 2A, at 430. The backup module can transmit the change list via a network, e.g., network 150 of FIG. 1. At 440, the backup module resets the change list. Resetting the change list can involve deleting all information in the change list. Alternatively, the backup module can move a pointer to point to the last entry in the current change list. New entries in subsequent change lists are created after the pointer. In such a case, when a subsequent backup operation is requested, the backup application can detect the location of the pointer and begin reading change entries at the entry after the pointer.

Figure 5:
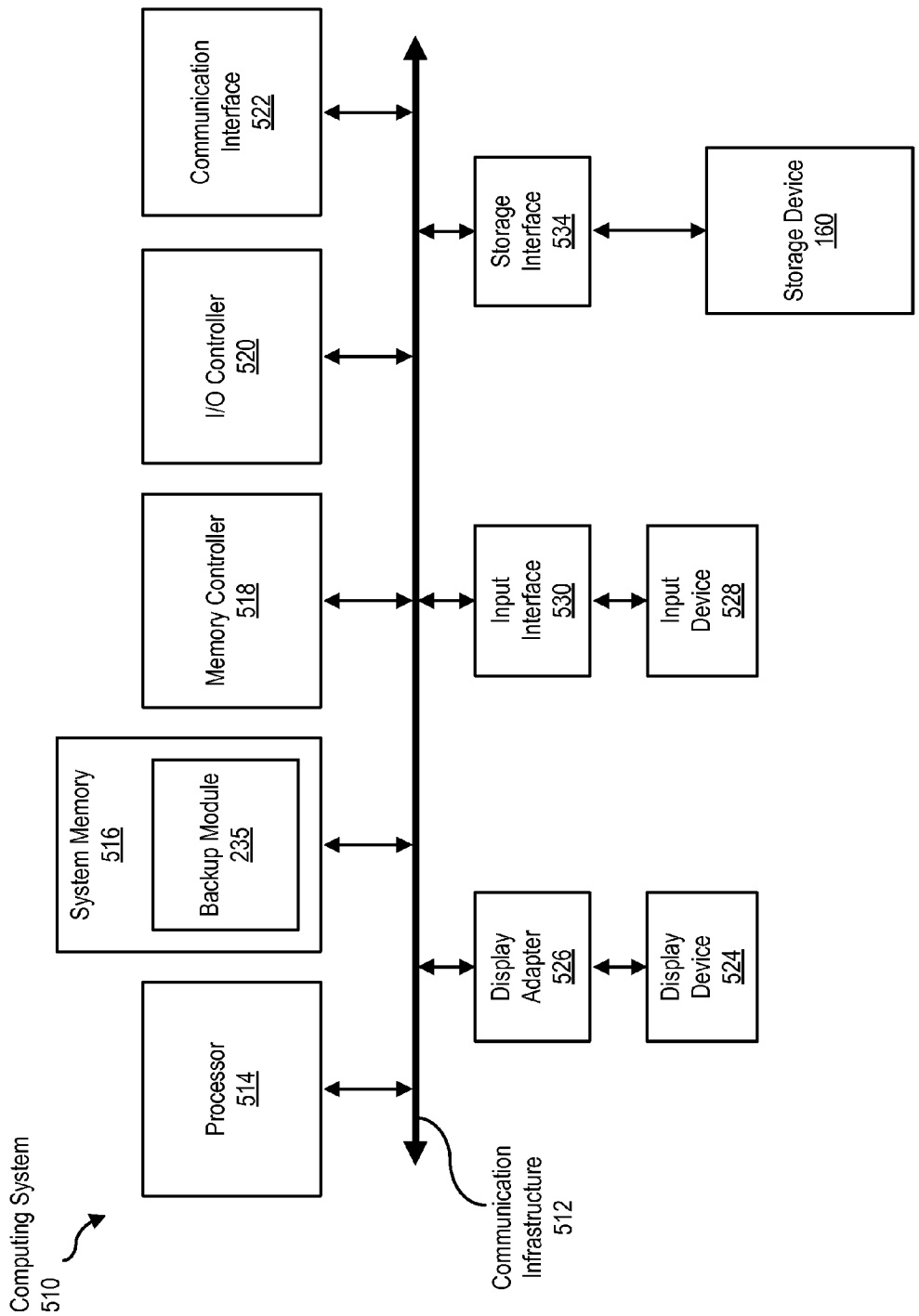
FIG. 5 is a block diagram of a computing device, illustrating how a backup module can be implemented in software, according to one embodiment of the present invention.

FIG. 5 is a block diagram of a computing device, illustrating how a backup module 235 can be implemented in software. Computing system 510 broadly represents any single or multi-processor computing device or system capable of executing computer-readable instructions. Examples of computing system 510 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 510 may include at least one processor 514 and a system memory 516. By executing the software that implements a resize manager 72, computing system 510 becomes a special purpose computing device that is configured to participate in dynamic virtual disk shrink operations.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing all or some of the operations described herein. Processor 514 may also perform and/or be a means for performing any other operations, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. In one example, program instructions implementing a RAM module 135 may be loaded into system memory 516.

In certain embodiments, computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 550, and storage interface 554.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1594 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, computing system 510 may also include at least one input device 528 coupled to communication infrastructure 512 via an input interface 550. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a data storage device 533 coupled to communication infrastructure 512 via a storage interface 534. Storage device 533 generally represents any type or form of storage device or medium capable of storing data and/or other computer-readable instructions. For example, storage device 533 may include a magnetic disk drive (e.g., a so-called hard drive), a floppy disk drive, an optical disk drive, a flash drive, or the like. Storage interface 534 generally represents any type or form of interface or device for transferring data between storage device 533 and other components of computing system 510.

In certain embodiments, storage device 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 533 may also include other similar structures or devices for allowing computer software, data, or other computer-readable instructions to be loaded into computing system 510. For example, storage device 533 may be configured to read and write software, data, or other computer-readable information. Storage device 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5.

Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 510 may be configured as an application specific integrated circuit (ASIC) adapted to implement one or more of the embodiments disclosed herein.

Figure 6:
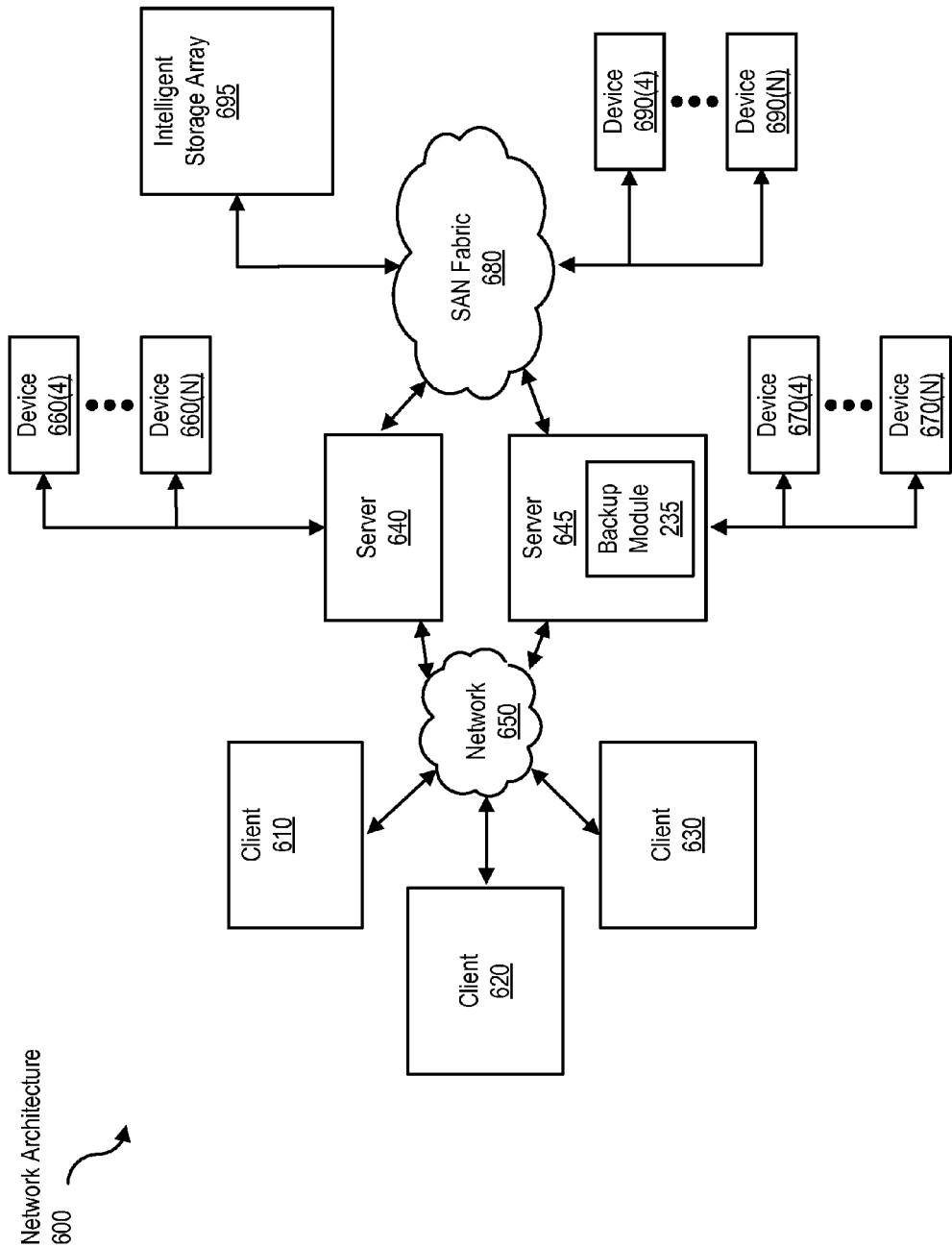
FIG. 6 is a block diagram of a networked system, illustrating how various computing devices can communicate via a network, according to one embodiment of the present invention.

FIG. 6 is a block diagram of a network architecture 600 in which client systems 610, 620, and 630 and servers 640 and 645 may be coupled to a network 650. Client systems 610, 620, and 630 generally represent any type or form of computing device or system.

Similarly, servers 640 and 645 generally represent computing devices or systems, such as application servers or database servers implemented on a computing device such as computing system 510 in FIG. 5, configured to provide various database services and/or execute certain software applications. Network 650 generally represents any telecommunication or computer network including, for example, an intranet, a wide area network (WAN), a local area network (LAN), a personal area network (PAN), or the Internet. In one example, servers 640 and/or 645 may include a RAM module 135 as shown in FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS).

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 510 of FIG. 5, a communication interface, such as communication interface 522 in FIG. 5, may be used to provide connectivity between each client systems 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, executed by server 645, and distributed to client systems 610, 620, and 630 over network 650.

In some examples, all or a portion of the computing devices in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, an archive module in FIG. 1 may transform behavior of a computing device in order to cause the computing device to backup a shared storage device.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method utilizing a computer for tracking changes in shared storage devices comprising:
   receiving a request to perform an incremental backup of a storage device, wherein the storage device is accessed by a plurality of nodes;
   generating a respective set of information by each of the plurality of nodes, wherein the generating comprises
      detecting input/output (I/O) operations, using a disk upper filter driver on a respective node, directed to a portion of the storage device or directed to a host operating system;
      in response to detecting the I/O operations are directed to the host operating system, passing a subset of the I/O operations to a file system driver stack and then to a storage device driver stack,
      in response to detecting the I/O operations are directed to a portion of the storage device, passing the subset of the I/O operations to the storage device driver stack and bypassing the file system driver stack,
   receiving the respective set of information from each of the plurality of nodes in response to the request, wherein
      the respective set of information comprises a change list that identifies locations in the storage device that have been modified by the respective node, and
      the locations comprise change data and metadata of the change data; and
   performing a backup operation comprising copying, to a backup device, change data from each of the locations identified in each of the sets of information, wherein the change data only occurs after a last backup operation is performed.

2. The method of claim 1, wherein
   the storage device driver stack is a group of related drivers that cooperate to handle I/O operations of the storage device, and
   the file system driver stack is a group of related drivers that cooperate to handle I/O operations of the file system.

3. The method of claim 1, wherein
   the storage device comprises a plurality of virtual hard disks (VHDs), wherein
   each VHD of the plurality of VHDs corresponds to a respective virtual machine of a plurality of virtual machines, and
   the plurality of virtual machines is implemented on the nodes.

4. The method of claim 1, further comprising:
   collating all sets of information received from the nodes, wherein the collating is performed by a coordinator node, and
   the coordinator node has exclusive rights to modify the metadata for the storage device.

5. The method of claim 1, wherein:
   the storage device driver stack is maintained by the host operating system, and the file system driver stack is maintained by the file system.

6. The method of claim 1, wherein
   the plurality of nodes comprises a coordinator node and a non-coordinator node, and
   the metadata is directly accessible only by the coordinator node.

7. The method of claim 1, wherein
   a first node implements a plurality of virtual machines, and
   the first node collates information identifying I/O requests generated by each virtual machine of the plurality of virtual machines.

8. A non-transitory computer readable storage medium storing program instructions executable to track changes in shared storage devices, wherein the program instructions are configured to:
   receive a request to perform an incremental backup of a storage device, wherein the storage device is accessed by a plurality of nodes;
   generate a respective set of information by each of the plurality of nodes, wherein the program instructions are further configured to:
      detect input/output (I/O) operations, using a disk upper filter driver on a respective node, directed to a portion of the storage device or directed to a host operating system;
      in response to detecting the I/O operations are directed to the host operating system, pass a subset of the I/O operations to a file system driver stack and then to a storage device driver stack,
      in response to detecting the I/O operations are directed to a portion of the storage device, pass the subset of the I/O operations to the storage device driver stack and bypass the file system driver stack,
   receive the respective set of information from each of the plurality of nodes in response to the request, wherein
      the respective set of information comprises a change list that identifies locations in the storage device that have been modified by the respective node, and
      the locations comprise change data and metadata of the change data; and
   perform a backup operation comprising copying, to a backup device, change data from each of the locations identified in each of the sets of information, wherein the change data only occurs after a last backup operation is performed.

9. The non-transitory computer readable storage medium of claim 8, wherein
   the storage device driver stack is a group of related drivers that cooperate to handle I/O operations of the storage device, and
   the file system driver stack is a group of related drivers that cooperate to handle I/O operations of the file system.

10. The non-transitory computer readable storage medium of claim 8, wherein the storage device comprises a plurality of virtual hard disks (VHDs), wherein
    each VHD of the plurality of VHDs corresponds to a respective virtual machine of a plurality of virtual machines, and
    the plurality of virtual machines is implemented on the nodes.

11. The non-transitory computer readable storage medium of claim 8, wherein the program instructions are further configured to:
    collate all sets of information received from the nodes, wherein
       collating the information is performed by a coordinator node, and the coordinator node has exclusive rights to modify the metadata for the storage device.

12. The non-transitory computer readable storage medium of claim 8, wherein
the storage device driver stack is maintained by the host operating system, and the file system driver stack is maintained by the file system.

13. The non-transitory computer readable storage medium of claim 8, wherein
the plurality of nodes comprises a coordinator node and a non-coordinator node, and
the metadata is directly accessible only by the coordinator node.

14. The computer readable storage medium of claim 8, wherein
a first node implements a plurality of virtual machines, and
the first node collates information identifying I/O requests generated by each virtual machine of the plurality of virtual machines.

15. A system for tracking changes in shared storage devices comprising:
one or more computer processors; and
a computer memory coupled to the one or more computer processors, wherein the computer memory stores program instructions executable by the one or more computer processors to:
receive a request to perform an incremental backup of a storage device, wherein the storage device is accessed by a plurality of nodes;
generate a respective set of information by each of the plurality of nodes, wherein the program instructions are further configured to:
detect input/output (I/O) operations, using a disk upper filter driver on a respective node, directed to a portion of the storage device or directed to a host operating system;
in response to detecting the I/O operations are directed to the host operating system, pass a subset of the I/O operations to a file system driver stack and then to a storage device driver stack,
in response to detecting the I/O operations are directed to a portion of the storage device, pass the subset of the I/O operations to the storage device driver stack and bypass the file system driver stack,
receive the respective set of information from each of the plurality of nodes in response to the request, wherein
the respective set of information comprises a change list that identifies locations in the storage device that have been modified by the respective node, and
the locations comprise change data and metadata of the change data; and
perform a backup operation comprising copying, to a backup device, change data from each of the locations identified in each of the sets of information, wherein the change data only occurs after a last backup operation is performed.

16. The system of claim 15, wherein
the storage device driver stack is a group of related drivers that cooperate to handle I/O operations of the storage device, and
the file system driver stack is a group of related drivers that cooperate to handle I/O operations of the file system.

17. The system of claim 15, wherein
the storage device comprises a plurality of virtual hard disks (VHDs), wherein
each VHD of the plurality of VHDs corresponds to a respective virtual machine of a plurality of virtual machines, and
the plurality of virtual machines is implemented on the nodes.

18. The system of claim 15, wherein the program instructions are further configured to:
collate the information received from the nodes, wherein
collating all sets of information is performed by a coordinator node, and
the coordinator node has exclusive rights to modify the metadata for the storage device.

19. The system of claim 15, wherein
the storage device driver stack is maintained by the host operating system, and the file system driver stack is maintained by the file system.

20. The system of claim 15, wherein
the plurality of nodes comprises a coordinator node and a non-coordinator node, and
the metadata is directly accessible only by the coordinator node.

* * * * *